(12) United States Patent
Wang et al.

(10) Patent No.: US 12,535,636 B2
(45) Date of Patent: Jan. 27, 2026

(54) METHOD FOR MANUFACTURING A LIGHT-GUIDE OPTICAL ELEMENT

(71) Applicant: VACTRONICS TECHNOLOGIES INC., Miaoli County (TW)

(72) Inventors: Yung-Chun Wang, Miaoli County (TW); Yung-Sheng Cheng, Miaoli County (TW); Hsang-Yang Lin, Miaoli County (TW); Sen-Tsung Hsiao, Miaoli County (TW)

(73) Assignee: Vactronics Technologies Inc., Miaoli County (TW)

( * ) Notice: Subject to any disclaimer, the term of this patent is extended or adjusted under 35 U.S.C. 154(b) by 312 days.

(21) Appl. No.: 18/500,397

(22) Filed: Nov. 2, 2023

(65) Prior Publication Data

US 2025/0147221 A1    May 8, 2025

(51) Int. Cl.
    *F21V 8/00*    (2006.01)
(52) U.S. Cl.
    CPC .................. *G02B 6/0065* (2013.01)
(58) Field of Classification Search
    CPC .................. G02B 6/0013; G02B 6/0065
    See application file for complete search history.

(56) References Cited

U.S. PATENT DOCUMENTS

| | | | |
|---|---|---|---|
| 2006/0018129 A1* | 1/2006 | Tang | G02B 6/0055 362/327 |
| 2015/0138646 A1* | 5/2015 | Tatsugi | G02B 6/0065 264/1.27 |
| 2017/0363799 A1* | 12/2017 | Ofir | G02B 6/00 |

\* cited by examiner

*Primary Examiner* — Sung H Pak
(74) *Attorney, Agent, or Firm* — Wang Law Firm, Inc.

(57) ABSTRACT

A light-guide optical element and a method for manufacturing the same, includes: a coating step including forming at least one functional coating on a surface of a substrate, and cutting the substrate to form at least one optical coating strip; a mounting step including placing at least one optical coating strip in a storage space of a first substrate; an assembling step including combining a second substrate corresponding to the first substrate with the first substrate, so that the at least one optical coating strip is positioned between the first substrate and the second substrate, forming a semi-finished product; and a cutting step including cutting the semi-finished product into at least one finished light-guide optical element, and the at least one finished light-guide optical element includes the at least one optical coating strip.

16 Claims, 6 Drawing Sheets

METHOD FOR MANUFACTURING A LIGHT-GUIDE OPTICAL ELEMENT

BACKGROUND

Field of the Invention

The present invention relates to a light-guide optical element and a method for manufacturing the same, and more particularly to a light-guide optical element and a method for manufacturing the same without the need for fixtures.

Description of Related Art

Light guide optical elements (LOEs) are widely used in various application fields, covering many different products and technologies. For example, they can be applied in the fields of Augmented Reality (AR) and Virtual Reality (VR) to integrate virtual content information into users' visual scenes through efficient optical systems, and achieve an immersive experience.

The main manufacturing method for the above-mentioned light guide optical element (LOE) is to stack and bond multiple hard lenses, first cut at a predetermined angle in a slant cutting manner, and then perform grinding and other processing to ensure accuracy and surface smoothness, ultimately forming at least one light guide optical element. However, the conventional manufacturing method uses a mold (fixture) to stack and fit multiple hard lenses. The shape of the mold and the cutting angle determine the structure and optical characteristics of the light guide optical element, such as the stackable thickness, shape, and surface structure, which makes it necessary to customize the mold for the conventional method. If there are hard lenses of different sizes, different molds need to be developed, as a result, the cost is increased. Besides, the design of the mold should take into account different needs to ensure that there is no optical deviation during the cutting process, and that the final LOE can perform its function correctly. Furthermore, in traditional practice, in order to maximize the cutting of the optical component at the preset angle, other areas will be sacrificed, making it unable to be cut and used again, resulting in increased material waste. According to this practice, in addition to the need to customize the mold, which increases costs, If there are defects or inaccuracies in the mold design, which can cause errors in the process of light guidance, and then resulting in light guide errors. This reduces the yield of the final LOE and increases the cost due to increased material waste.

SUMMARY

The present invention provides a light-guide optical element and a method for making the same, the objective of which is lightweight and cost reduction.

Another objective of the present invention is to eliminate the need for fixtures.

To achieve the above objectives, a light-guide optical element and the method for manufacturing the same, provided by the invention comprises:

a coating step including forming at least one functional coating on a surface of a substrate, and cutting the substrate with the at least one functional coating to form at least one optical coating strip;

a mounting step including placing at least one optical coating strip in a storage space of a first substrate; wherein the first substrate includes a plurality of first convex parts and a plurality of second convex parts, each of the first convex parts includes an inclined supporting surface, each of the second convex parts includes a stop surface facing the inclined supporting surface, and the stop surface is connected to the inclined supporting surface, the at least one optical coating strips is abutted against the inclined supporting surface, and the stop surface is used to stop the at least one optical coating strip;

an assembling step including combining a second substrate corresponding to the first substrate with the first substrate, so that the at least one optical coating strip is positioned between the first substrate and the second substrate, forming a semi-finished product; and a cutting step including cutting the semi-finished product into at least one finished light-guide optical element, and the at least one finished light-guide optical element includes the at least one optical coating strip.

More specifically, the at least one functional coating is formed by chemical vapor deposition, physical vapor deposition, or coating process.

Preferably, the at least one functional coating is an anti-reflective coating.

More specifically, the substrate is made of glass or plastic.

More specifically, the optical coating strip is attached to the inclined supporting surface by adhesive, and refractive indices of the adhesive, the first substrate, and the second substrate are similar or the same.

More specifically, the second substrate is formed by injection molding, curing adhesive, or inlay board.

More specifically, the second substrate has the same shape and material as the first substrate.

More specifically, the method further comprises a curing step to cure the semi-finished product by light or heat.

A light-guide optical element is manufactured by the method, wherein the light-guide optical element includes a part of the at least one optical coating strip, the first substrate and the second substrate, and the at least one optical coating strip is positioned between the first substrate and the second substrate.

From the above, it can be seen that the present invention achieves lightweight by selecting the plastic as the substrate. By stacking the optical coating strip in the storage space with the first substrate and the second substrate having identical shape, the second substrate can be another first substrate, thereby achieving the effect of not requiring fixtures. Then, through the cutting step, at least one finished light-guide optical element is obtained, and the present invention has the advantages of lightweight, no need for fixtures, and cost reduction.

DETAILED DESCRIPTION

Figure 1:
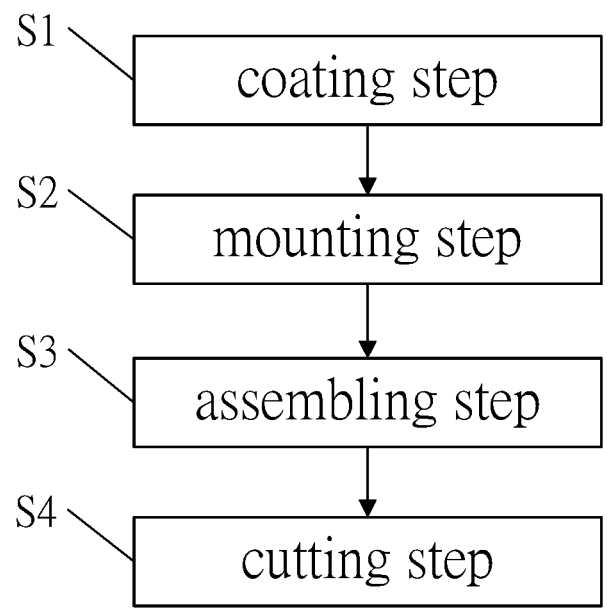
FIG. 1 is a flowchart of the present invention.

Various embodiments will be described in the following text, and those with general knowledge in the technical field should be able to easily understand the spirit and principles of the present invention by referring to the drawings. However, although specific embodiments will be specified in the text, these embodiments are only illustrative and are not considered restrictive or exhaustive in all aspects. Therefore, for those with ordinary knowledge in the technical field, without departing from the spirit and principles of the present invention, the various changes and modifications of the present invention should be obvious and easily achievable. The drawings have been simplified for illustrative purposes only, and the structure or method invention of the present invention is explained by describing the relationship between the components of the present invention. Therefore, the components shown in the drawings are not presented in actual quantity, actual shape, actual size, or actual proportion, and the size or size proportion has been enlarged or simplified to provide better explanation. The actual quantity, actual shape, or actual size proportion has been selectively designed and configured, while the detailed component layout may be more complex.

The present invention provides a method for manufacturing a light-guide optical element, as shown in FIG. 1, comprising a coating step S1, a mounting step S2, an assembling step S3, and a cutting step S4, ultimately forming a finished light-guide optical element 100.

Figure 2:
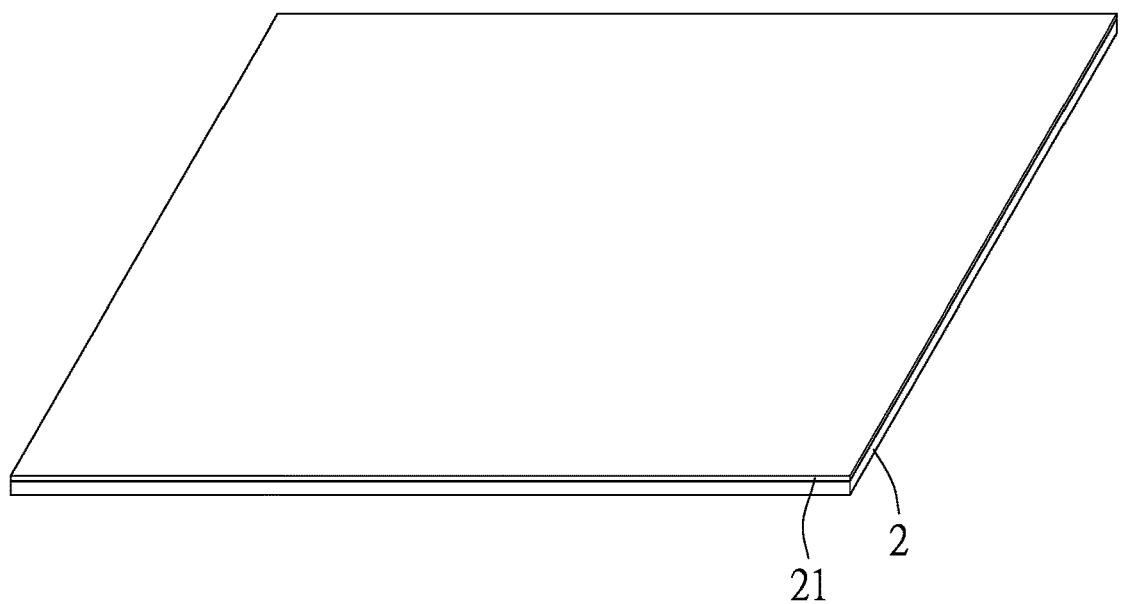
FIG. 2 is an illustrative view of the coating step.
Figure 3:
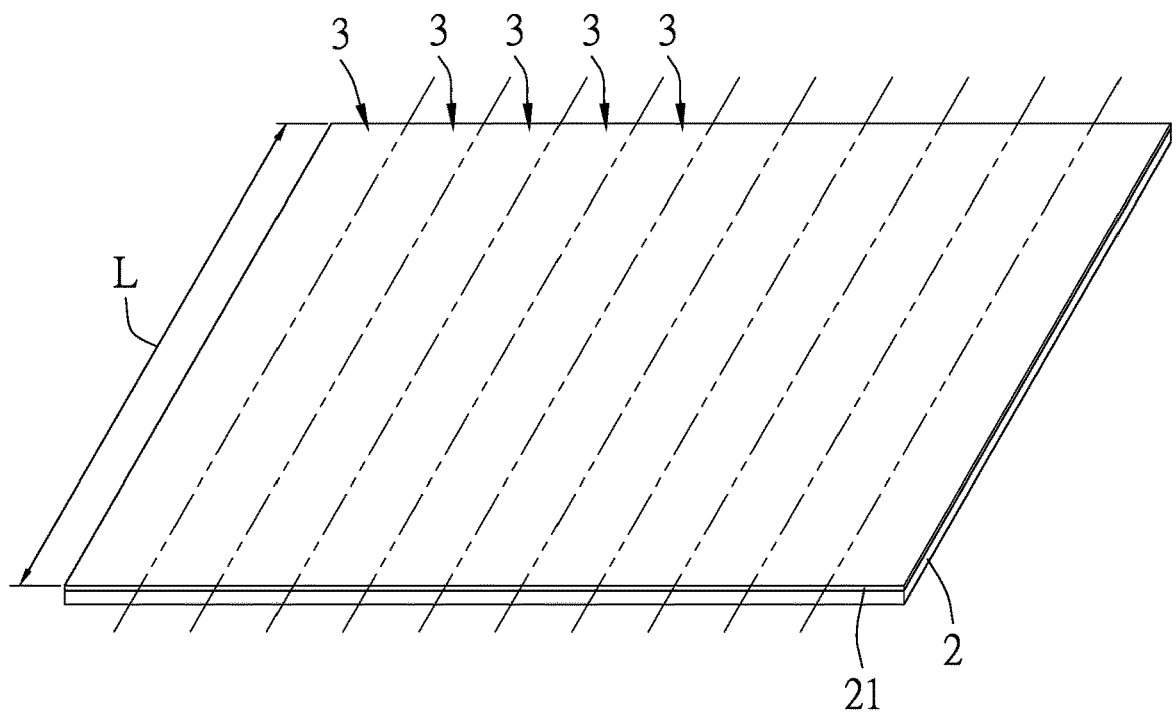
FIG. 3 is an illustrative view of the optical coating strip formed on the substrate.

Please refer to FIG. 2, the coating step S1 is to form at least one functional coating 21 on a surface of a substrate 2. The functional coating 21 can be formed by chemical vapor deposition (CVD), physical vapor deposition (PVD), or coating process. The functional coating 21 can be AR with R ranging from 1 to 50%, and can also be a multifunctional coating in various well-known technologies, but not limited thereto. Please refer to FIG. 3, then, the substrate 2 with the functional coating 21 is cut according to the required size to form at least one optical coating strip 3. The substrate 2 can be commonly used glass or plastic. In this embodiment, the substrate 2 is a thin plastic substrate with a thickness of 200 µm to 300 µm, so as to reduce weight, and the functional coating 21 is an anti reflection (AR) coating, aimed at reducing reflection and enhancing transparency, in order to improve performance and usability, but not limited thereto. The substrate 2 can be selected according to user's needs and different materials and thicknesses of the functional coating 21 can be formed. As the method of forming the functional coating 21 on the substrate 2 is a well-known technique, it will not be repeated here.

Figure 4:
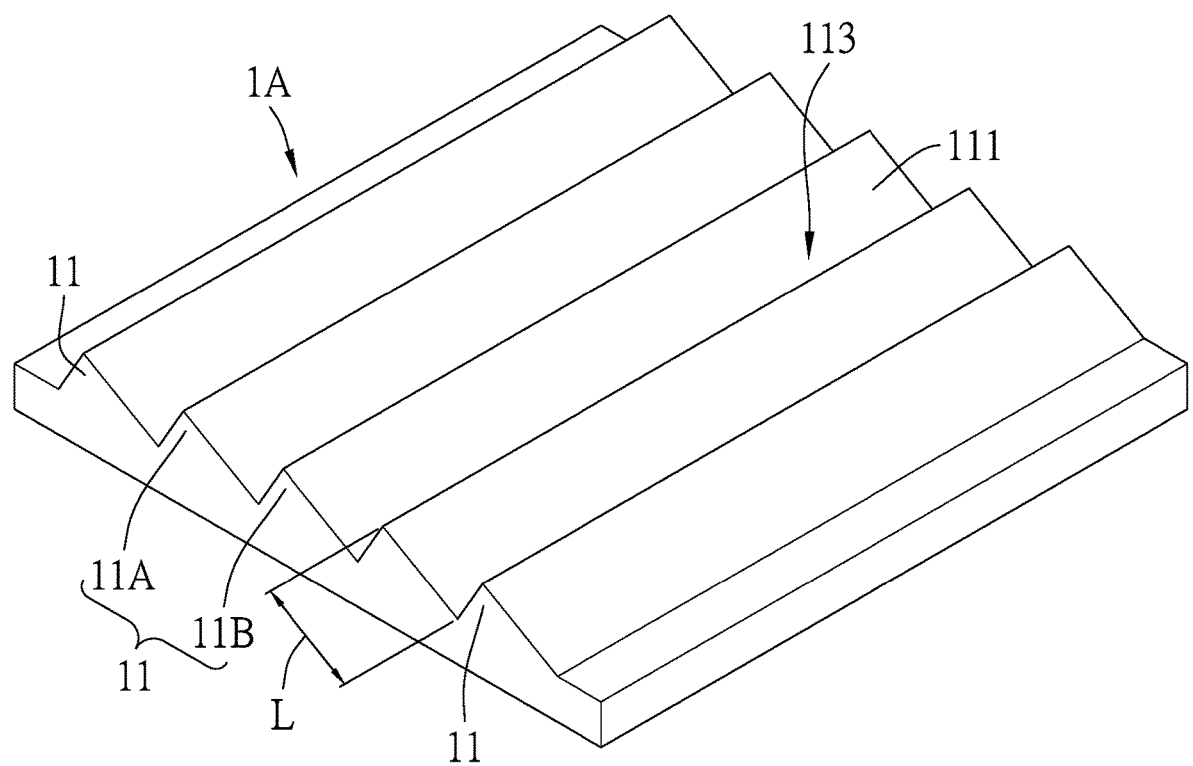
FIG. 4 is a three-dimensional illustrative view of the first substrate.
Figure 5:
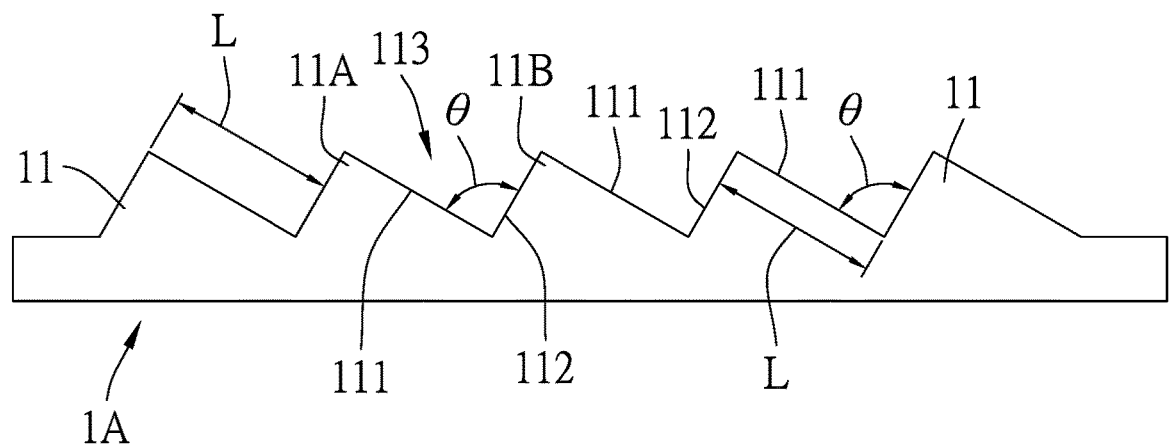
FIG. 5 is a cross-sectional illustrative view of the first substrate.
Figure 6:
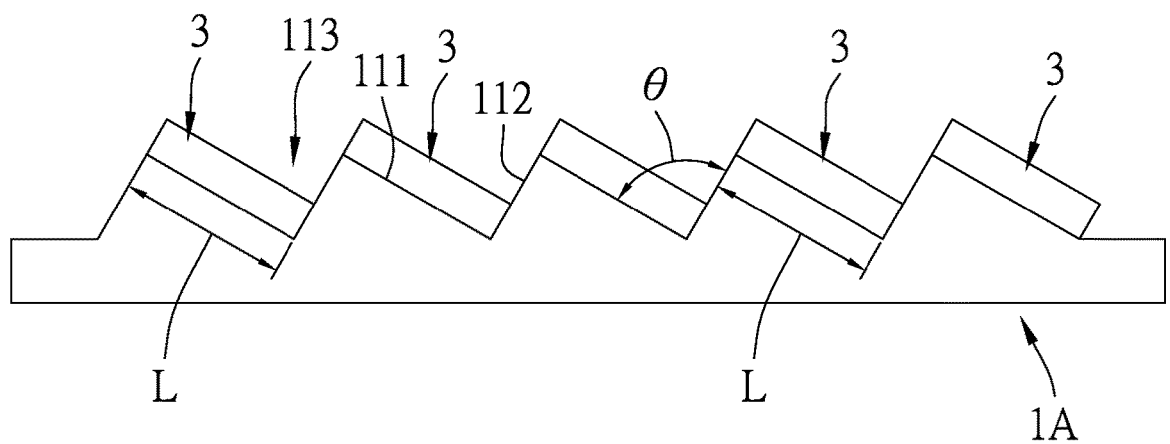
FIG. 6 is a cross-sectional illustrative view of the mounting step of an embodiment.

Please refer to FIGS. 4 to 6, the mounting step S2 involves placing at least one optical coating strip 3 on a first substrate 1A. More specifically, the first substrate 1A can be made by mold or conventional methods. The first substrate 1A includes a plurality of identical convex parts 11, which are generally cylindrical. For better illustration, two of the convex parts 11 are defined as a first convex part 11A and a second convex part 11B, in detail, a plurality of first convex parts 11A and a plurality of second convex parts 11B which are adjacent to each other, and the first convex parts 11A and the second convex parts 11B are identical (i.e. the convex parts 11). Please refer to FIGS. 4 and 5, the first convex part 11A includes an inclined supporting surface 111, the second convex part 11B includes a stop surface 112 facing the inclined supporting surface 111, and the inclined supporting surface 111 is inclined towards the stop surface 112. The stop surface 112 is connected to the inclined supporting surface 111, and an inclination angle θ is defined between the stop surface 112 and the inclined supporting surface 111. The inclination angle θ is adjusted according to the user's needs, as in this embodiment, the inclination angle θ ranges between 22 and 27 degrees. In an embodiment, the inclination angle θ is 23.8 degrees, in an embodiment, the inclination angle θ is 26.6 degrees. The inclination angle θ can be adjusted according to the penetration rate of the finished light-guide optical element 100 and the size of the optical coating strip 3, but not limited thereto. The stop surface 112 and the inclined supporting surface 111 co-define a storage space 113. The inclined supporting surface 111 has a length L, which is cut according to the optical coating strip 3. This cutting method is well-known and can be done by any means, and will not be repeated here. Place at least one optical coating strip 3 in the storage space 113, as shown in FIG. 6, wherein one of the optical coating strips 3 is attached to the inclined supporting surface 111 and the stop surface 112; Multiple optical coating strips 3 can be sequentially stacked in the storage space 113, without being limited thereto. In this embodiment, the optical coating strip 3 is attached to the inclined supporting surface 111 by adhesive, wherein the adhesive is made of a material with a refractive index similar to the first substrate 1A, the inclined supporting surface 111 is used to stack the optical coating strips 3, and the stop surface 112 is used to stop the optical coating strips 3, so that the optical coating strips 3 are tilted and fixed in the storage space 113.

It is worth noting that the optical coating strip 3 can be either a soft coating or a hard coating, and in this embodiment, it is a hard coating, but not limited thereto. The selection depends on the specific application needs of the user.

Figure 7A:
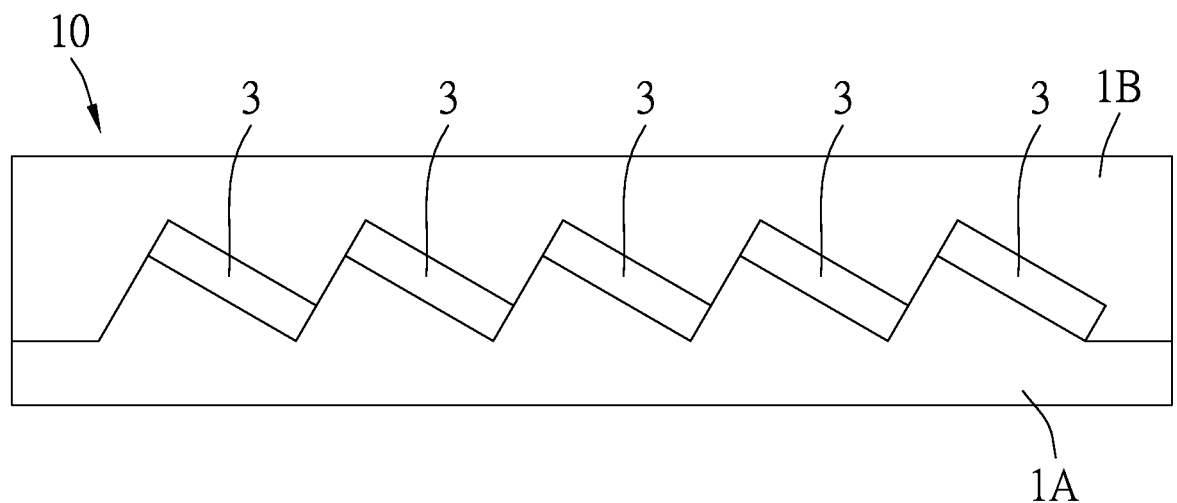
FIG. 7A is an illustrative view of a semi-finished product.

Please refer to FIG. 7A, the assembling step S3 includes combining a second substrate 1B corresponding to the first substrate 1A with the first substrate 1A, so that the optical coating strip 3 is between the first substrate 1A and the second substrate 1B, forming a semi-finished product 10. The second substrate 1B can be formed through processes such as injection molding, curing adhesive, or inlay board. As these processes are all well-known techniques, it will not be repeated here. In this embodiment, the second substrate 1B is formed around the first substrate 1A through injection molding, so that the shape of the second substrate 1B is the same as that of the first substrate 1A, but not limited thereto. In one embodiment, use another first substrate 1A (which can be considered as the second substrate 1B at this time) to combine with the first substrate 1A to form the semi-finished product 10.

In an embodiment, the assembling step S3 may include a curing step after or before, but not limited thereto, to increase the integrity and hardness of the semi-finished product 10. The curing step may be carried out by any suitable means, including but not limited to curing in the form of light or heat.

Figure 7B:
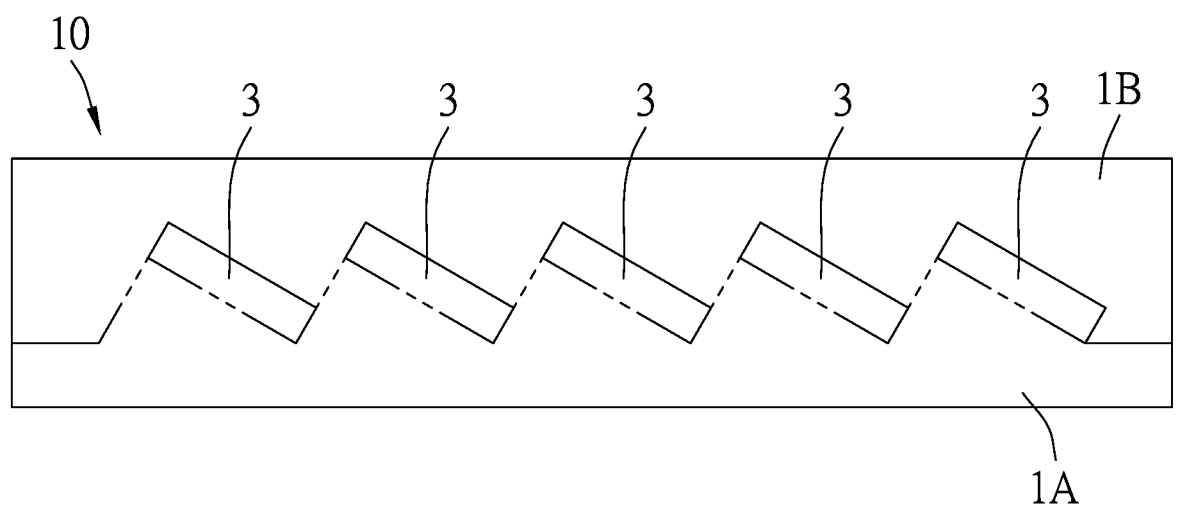
FIG. 7B is an illustrative view of a semi-finished product.

Please refer to FIGS. 7A and 7B, it is worth noting that the second substrate 1B is made of the same material as the first substrate 1A and can be regarded as the same medium. The adhesive has a refractive index similar to or the same as the first substrate 1A and the second substrate 1B, which can be regarded as the same medium. Therefore, the semi-finished product 10 can be seen as shown in FIG. 7B, and only the optical coating strips 3 can be seen, thereby, when the semi-finished product 10 is be cut in step S4, eliminating the possibility of light refraction loss caused by refractive index differences, reducing the complexity of the semi-finished product 10, and making the finished light-guide optical element 100 more consistent and stable.

Figure 8:
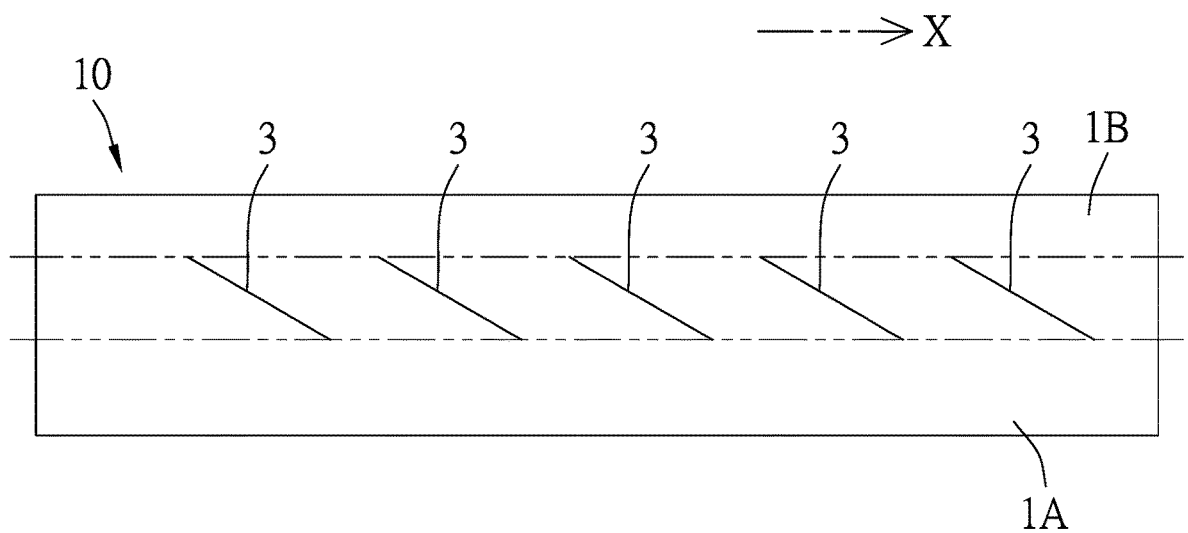
FIG. 8 is a cross-sectional illustrative view of the cutting step.
Figure 9:
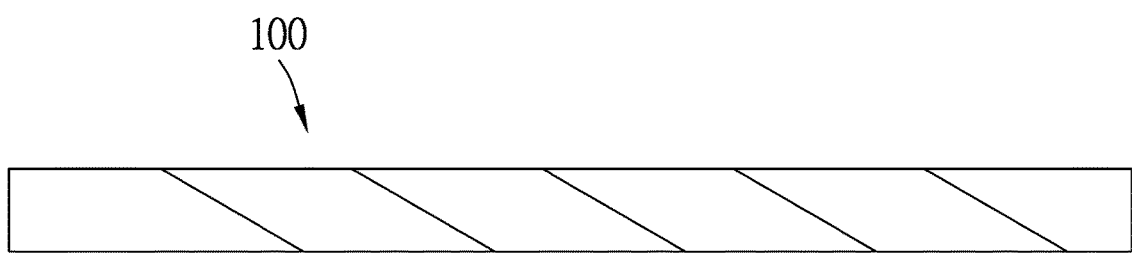
FIG. 9 is a cross-sectional illustrative view of the finished light-guide optical element in a preferred embodiment.

Please refer to FIGS. 8 and 9, the cutting step S4 involves cutting the semi-finished product 10 into the finished light-guide optical element 100, wherein the finished light-guide optical element 100 includes at least one optical coating strip 3, the first substrate 1A, and the second substrate 1B. More specifically, the cutting step S4 involves physically cutting the semi-finished product 10, cutting some of the first substrates 1A, the second substrates 1B, and the optical coating strips 3, so as to obtain the finished light-guide optical element 100 of a specific shape and size. In this embodiment, the finished light-guide optical element 100 includes at least some of the optical coating strips 3, the first substrates 1A, and the second substrates 1B. The optical coating strip 3 is located between the first substrate 1A and the second substrate 1B, thereby eliminating the need for stacking by fixture. The present invention utilizes accommodating the optical coating strip 3 between the first substrate 1A and the second substrate 1B, the first substrate 1A is tightly combined with the second substrate 1B, and the excess part is cut off to form the finished light-guide optical element 100, so that the finished light-guide optical element 100 can be directly used without further processing. It is worth noting that the size of the finished light-guide optical element 100 is between nanometers and centimeters, which is very small. Therefore, even if some of the first substrates 1A, the second substrates 1B, and the optical coating strips 3 are removed, it will not cause excessive increase in consumables.

Please refer to FIG. 8, the cutting step S4 is carried out on a cutting device that moves in a cutting direction X. The cutting device can be a laser cutting machine, diamond cutting machine, drill bit, drilling rig, cutting disc, or wire saw or other well-known technologies. In this embodiment, the cutting direction X is the same as the extension direction of the first substrate 1A, but it is not limited thereto. The cutting device can be replaced and adjusted according to user's needs, to meet the different shapes, sizes, and optical requirements of the finished light-guide optical element.

Please refer to FIGS. 8 and 9, the finished light-guide optical element 100 includes at least a portion of the optical coating strips 3, the second substrates 1B, and the first substrates 1A, and the optical coating strip 3 is between the second substrate 1B and the first substrate 1A.

In summary, the present invention first uses a thin plastic substrate as the substrate 2 to lighten the finished light-guide optical element 100, and then stacks the optical coating strips 3 in the storage space 113 as desired. By clamping the second substrate 1B with the first substrate 1A which have a shape corresponding to each other, the optical coating strip 3 is firmly positioned in the storage space 113 to form an integrated structure of the semi-finished product 10. Then, the cutting device is used to cut according to the user's needs to form the finished light-guide optical element 100. This eliminates the need for precise fixtures, reduces costs, saves production time, and allows for the curing step before or after the cutting step S4, making the finished light-guide optical element 100 less prone to damage and lightweight.

What is claimed is:

1. A method for manufacturing a light-guide optical element comprising:

a coating step including forming at least one functional coating on a surface of a substrate, and cutting the substrate with the at least one functional coating to form at least one optical coating strip;

a mounting step including placing at least one optical coating strip in a storage space of a first substrate, wherein the first substrate includes a plurality of first convex parts and a plurality of second convex parts, each of the first convex parts includes an inclined supporting surface, each of the second convex parts includes a stop surface facing the inclined supporting surface, and the stop surface is connected to the inclined supporting surface, the at least one optical coating strips is abutted against the inclined supporting surface, and the stop surface is used to stop the at least one optical coating strip;

an assembling step including combining a second substrate corresponding to the first substrate with the first substrate, so that the at least one optical coating strip is positioned between the first substrate and the second substrate, forming a semi-finished product; and a cutting step including cutting the semi-finished product into at least one finished light-guide optical element, and the at least one finished light-guide optical element includes the at least one optical coating strip.

2. The method for manufacturing the light-guide optical element as claimed in claim 1, wherein the at least one functional coating is formed by chemical vapor deposition, physical vapor deposition, or coating process.

3. The method for manufacturing the light-guide optical element as claimed in claim 2, wherein the at least one functional coating is an anti-reflective coating.

4. The method for manufacturing the light-guide optical element as claimed in claim 1, wherein the substrate is made of glass or plastic.

5. The method for manufacturing the light-guide optical element as claimed in claim 1, wherein the optical coating strip is attached to the inclined supporting surface by adhesive, and refractive indices of the adhesive, the first substrate, and the second substrate are similar or the same.

6. The method for manufacturing the light-guide optical element as claimed in claim 1, wherein the second substrate is formed by injection molding, curing adhesive, or inlay board.

7. The method for manufacturing the light-guide optical element as claimed in claim 1, wherein the second substrate has the same shape and material as the first substrate.

8. The method for manufacturing the light-guide optical element as claimed in claim 1 further comprising a curing step to cure the semi-finished product by light or heat.

9. A light-guide optical element manufactured by the method as claimed in claim 1, wherein the light-guide optical element includes a part of the at least one optical coating strip, the first substrate and the second substrate, and the at least one optical coating strip is positioned between the first substrate and the second substrate.

10. A light-guide optical element manufactured by the method as claimed in claim 2, wherein the light-guide optical element includes a part of the at least one optical coating strip, the first substrate and the second substrate, and the at least one optical coating strip is positioned between the first substrate and the second substrate.

11. A light-guide optical element manufactured by the method as claimed in claim 3, wherein the light-guide optical element includes a part of the at least one optical coating strip, the first substrate and the second substrate, and the at least one optical coating strip is positioned between the first substrate and the second substrate.

12. A light-guide optical element manufactured by the method as claimed in claim 4, wherein the light-guide optical element includes a part of the at least one optical coating strip, the first substrate and the second substrate, and the at least one optical coating strip is positioned between the first substrate and the second substrate.

13. A light-guide optical element manufactured by the method as claimed in claim 5, wherein the light-guide optical element includes a part of the at least one optical coating strip, the first substrate and the second substrate, and the at least one optical coating strip is positioned between the first substrate and the second substrate.

14. A light-guide optical element manufactured by the method as claimed in claim 6, wherein the light-guide optical element includes a part of the at least one optical coating strip, the first substrate and the second substrate, and the at least one optical coating strip is positioned between the first substrate and the second substrate.

15. A light-guide optical element manufactured by the method as claimed in claim 7, wherein the light-guide optical element includes a part of the at least one optical coating strip, the first substrate and the second substrate, and the at least one optical coating strip is positioned between the first substrate and the second substrate.

16. A light-guide optical element manufactured by the method as claimed in claim 8, wherein the light-guide optical element includes a part of the at least one optical coating strip, the first substrate and the second substrate, and the at least one optical coating strip is positioned between the first substrate and the second substrate.

\* \* \* \* \*